United States Patent [19]
Nguyen

[11] Patent Number: 5,323,166
[45] Date of Patent: Jun. 21, 1994

[54] DEVICE AND METHOD FOR RECONSTRUCTING A VECTOR WAVE FROM AMPLITUDE MEASUREMENTS

[76] Inventor: Dung B. Nguyen, 40 Donna Drive #B4, New Haven, Conn. 06513

[21] Appl. No.: 983,796

[22] Filed: Nov. 30, 1992

[51] Int. Cl.$^5$ ............................ G01S 5/02; G01S 5/04
[52] U.S. Cl. ..................................... 342/417; 342/445
[58] Field of Search ............... 342/417, 430, 432, 439, 342/445, 431; 343/793, 810, 794, 797, 805, 808

[56] References Cited

U.S. PATENT DOCUMENTS 2,489,276 11/1949 Fairall ................................ 342/430
3,939,477 7/1976 Green et al. ........................ 342/417

Primary Examiner—Gregory C. Issing

[57] ABSTRACT

A device and method for reconstructing a vector wave and its source direction by measuring the amplitudes of the vector wave in directions chosen according to a necessary and sufficient condition that ensures that the measured amplitudes contain enough information to provide a unique set of relative phases among the sinusoidally time-varying components of the vector wave. Together with the amplitudes, these relative phases are processed by a microprocessor to yield the polarization characteristics of the vector wave and the direction of its source.

7 Claims, 2 Drawing Sheets

DEVICE AND METHOD FOR RECONSTRUCTING A VECTOR WAVE FROM AMPLITUDE MEASUREMENTS

BACKGROUND

1. Field of Invention

This invention relates to vector-wave characterizations, specifically to the determination of the relative phases among the wave's vector components, the wave's polarization, and the direction of the wave's source.

2. Background of the Invention

In many practical situations, one needs to know the relative phases among the sinusoidally time-varying components of a vector. This vector often arises from the propagation of a vector-wave (such as an electromagnetic wave, as opposed to a scalar wave such as a sound wave). The determination of the polarization characteristics of an antenna, for example, requires that the relative phases among the three spatial components of the electric field vector, as well as their amplitudes, be measured. A commonly used procedure is to find the direction (known as the null direction), projected along which the amplitude is zero; the polarization ellipse then lies in the plane (known as the polarization plane) perpendicular to this null direction. Further measurements are needed in the polarization plane to determine the shape, size, eccentricity, and other characteristics of the ellipse. The disadvantages of these measurements are well-known in the art:

(a) The null direction is found by trial and error; repeated measurements in different directions must be made until the null direction is found.

(b) These measurements must be performed sequentially; the choice of direction along which one performs the next amplitude measurement depends on the amplitudes found in previous measurements.

(c) The number of measurements in this trial-and-error method cannot be determined in advance. Moreover, additional measurements must be made in the polarization plane until one can trace out an ellipse.

(d) These measurements are time-consuming in practice, and if the wave is a transient event, the method described above is not possible.

Furthermore, the relative phases among the three spatial components of the wave vector are obtained by recording how each component changes with time with respect to a reference time-base signal (known as the "synchronizing lead"); the relative phases are then computed from time-delay measurements relative to the synchronizing lead.

(e) These time-delay measurements pose well-known practical problems at high frequencies.

(f) They are impossible at low intensity, where the quantum nature of measurements forbids it.

The relative phases among the components of a sinusoidally time-varying vector are also needed in determining the source direction of plane vector waves, and in these situations, there are no synchronizing leads.

(h) Measuring time delay of the components with respect to one selected component is unreliable in practice.

(i) Even when it is reliable, the method still fails entirely for electromagnetic field whose intensities are low enough to reveal individual photons. The failure is due to the quantum nature of light where the detection of photons is an all-or-none event, and if a photon is detected in, say, the x-direction, then no photon will be detected in the y-direction. No time delay measurement between the x- and the y-component is possible since no photon is detected in the latter component.

More generally, in quantum systems, the amplitudes are related to the probabilities of finding a particular value of a quantum number, such as spin, in a particular direction in three-dimensional space. The relative phases in this case give the orientation of the quantum state in the quantum system's Hilbert space, and give rise to interference behavior.

(j) In these quantum systems, it is impossible to measure the relative phases directly because there is no quantum "synchronizing lead".

SUMMARY OF THE INVENTION

The main object of the invention described in this application is to find the source direction and the polarization characteristics of a sinusoidally time-varying vector wave from independent amplitude measurements. This and other objects of this invention are achieved by constructing a device which measures the vector wave's amplitudes in six different, and specially chosen spatial directions. These six directions are chosen so that the measured amplitudes contain independent information regarding the relative phases among the vector wave's three spatially orthogonal components. The amplitudes are converted into digital form (by an A-D converter when the intensity is high, and by a counter when the intensity is low and quantum effect predominates) and read by a microprocessor which computes the two relative phases from the six amplitude measurements. From the two relative phases already obtained, the microprocessor computes the source direction and other polarization characteristics of the vector wave.

This device works at all frequencies and at all intensities, including those intensities low enough for quantum effects to be dominate. These and other features and advantages will be clearly seen from the following detailed description with reference to the attached drawings.

DETAILED DESCRIPTION OF THE INVENTION

Figure 1:
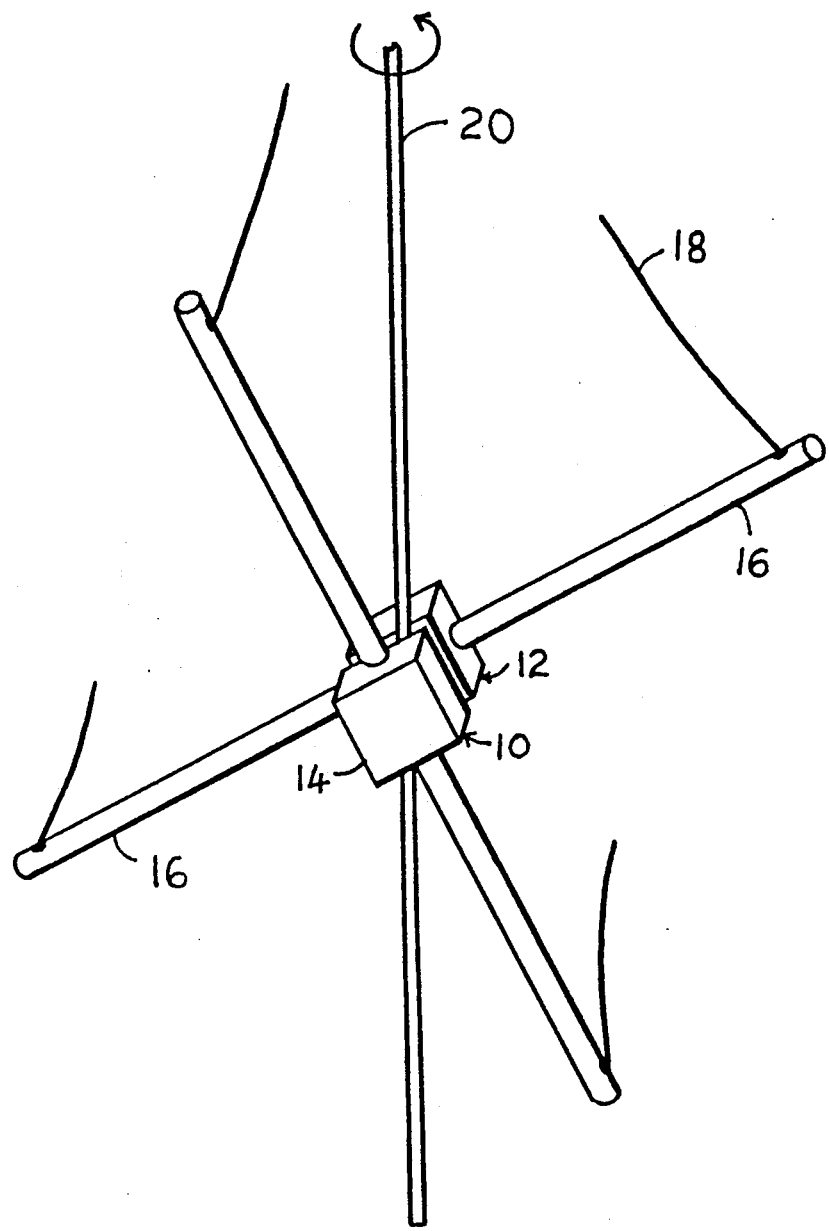
FIG. 1 illustrates the device described in this application. It comprises two amplitude-measuring units mounted at right-angle to each other and at an angle with respect to an axis in a manner that makes the device functions as described.

FIG. 1 illustrates the device that measures six amplitudes in a specially chosen spatial directions. It comprises two diodes, diode 10 and diode 12. Each diode has a small body 14 approximately 1 mm$^3$ in volume and two short arms 16, each approximately 3 mm long. It is well-known in the art that when such a diode is exposed to the electromagnetic field, the voltage developed across the body is proportional to the amplitude of the field projected in the direction of the two arms. Initial calibrations will determine the proportionality constant once and for all, and thereafter, the diode's voltage output is multiplied by the constant to yield the amplitude of the electromagnetic field in the direction of the arms. These arms are in turn connected to the rest of the circuitry of the device by high-resistance leads 18.

The electromagnetic field of each diode is that of a Hertzjan dipole, and thus, when mounted at right-angle to each other, they do not mutually interfere because the electric field due to Diode 10 meets the arms of Diode 12 at right angle, and vice versa. The diodes, therefore, respond to the incoming electromagnetic field, and not to the electromagnetic field of each other. The arms of Diode 12 are mounted at an angle to $\cos^{-1}(1/\sqrt{3})$ or approximately 54.7 degrees relative to a support axle 20 which can cause both diodes to rotate as shown in FIG. 1.

Figure 2:
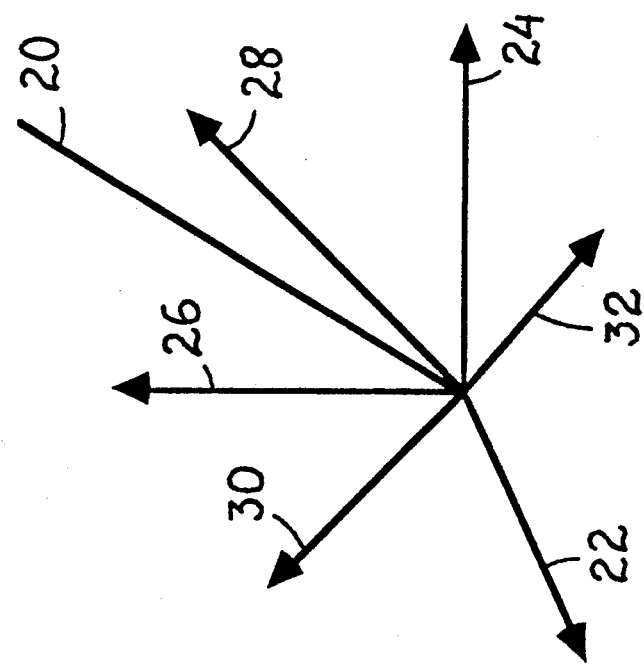
FIG. 2 illustrates the six spatial directions (those having arrowhead) along which the device in FIG. 1 will measure amplitudes as well as the direction of the support axle of the device (the line without arrowhead).

Because of the geometry of the mounting of the diodes, when the support axle 20 is rotated by 120 and 240 degrees, the arms of Diode 12 will point, as shown in FIG. 2, in the direction of the x-axis 22, y-axis 24, and z-axis 26, and the arms of Diode 10 will point in the direction of the vectors $N_1$ 28, $N_2$ 30, and $N_3$ 32, respectively, in the same figure. In the xyz-coordinate system of FIG. 2, the support axle 20 points in the direction of the vector $(1, 1, 1)$; the vectors $N_1$ 28 is $(1, 1, 0)$, $N_2$ 30 is $(0, 1, 1)$, and $N_3$ 32 is $(1, 0, 1)$. The bodies of the diodes lie at the origin. It will be demonstrated subsequently that the directions $N_1$, $N_2$, and $N_3$ above satisfy the necessary and sufficient condition for the measured amplitudes to determine the relative phases among the x-, y-, and z-components of the incoming electromagnetic field uniquely. Any set of directions not satisfying said condition will fail to reconstruct the relative phases uniquely; amplitudes measured along them will be useless. Said condition will also show that in three dimensional space, less than six amplitude measurements will not suffice, and more than six is not necessary.

Figure 3:
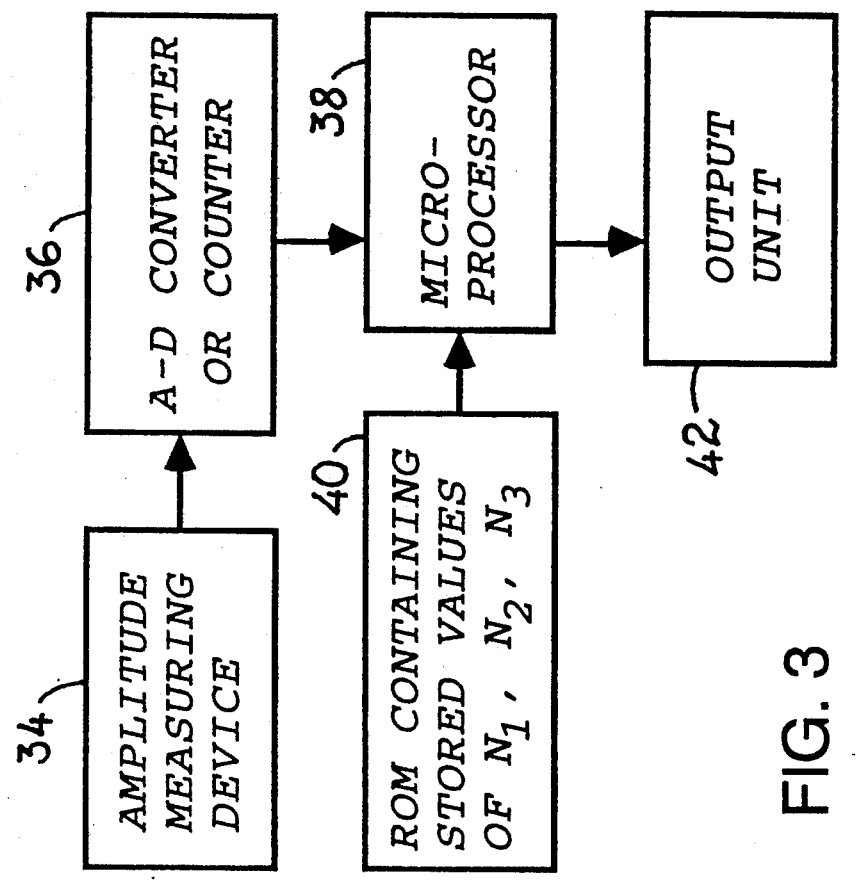
FIG. 3 is a block diagram of the circuitry of the device for carrying out the method of the invention.

FIG. 3 illustrates the block diagram of the circuitry of the device for carrying out the method of the invention described in this application. The Amplitude Measuring Device 34 has already been described in detail above in reference to FIG. 1 and FIG. 2. Its outputs are the high-resistance leads 18 in FIG. 1 conveying the voltages from the arms 16 of the diodes to an A-D converter 36 which digitizes the voltages for the microprocessor 38 to carry out the method of the invention, to be described below.

The reason that the device works comes from the non-linear relationship between amplitudes and relative phases of the components of a complex vector in n dimensions. The device described in this invention corresponds to the special case when n, the dimension of the space, is three. The basic result of the mathematics below is a criterion for selecting the unobvious directions along which one should measure the amplitudes. Any device failing to satisfy the criterion will not work. The theory behind the device described in this application is explained in detail in the following:

Let $A_1, \ldots, A_n$ be the amplitudes of the sinusoidally time-varying components of a real vector X in a Cartesian coordinate system. Let $B_1, \ldots, B_k$ be the amplitudes of X projected in k directions specified by unit vectors $N_1, N_2, \ldots, N_k$.

Let Z be a complex vector whose components are complex numbers with the given amplitudes $A_1, \ldots, A_n$. Let $\phi_2, \phi_3, \ldots, \phi_n$ be the phases among the components of Z relative to $\phi_1$, which is set equal to zero. For any finite positive integer n greater than 1, the time-dependent behavior of $X = \text{Re}\{Z\ e^{j\omega t}\}$ is described by a two-dimensional ellipse (including straight line segment as a degenerate ellipse). The major axis V of the ellipse is given by:

$$V = \begin{pmatrix} A_1 \cos(\phi_1 - \psi) \\ A_2 \cos(\phi_2 - \psi) \\ \vdots \\ A_n \cos(\phi_n - \psi) \end{pmatrix}. \quad (1)$$

The minor axis R of the ellipse is given by:

$$R = \begin{pmatrix} A_1 \sin(\phi_1 - \psi) \\ A_2 \sin(\phi_2 - \psi) \\ \vdots \\ A_n \sin(\phi_n - \psi) \end{pmatrix}, \quad (2)$$

Let N be a unit vector in an arbitrary direction. The amplitude of the projection of X in the direction N is $$C = \sqrt{\{(V, N)\}^2 + \{(R, N)\}^2}. \quad (3)$$

Or more generally, given k directions specified by the unit vectors $N_1, N_2, \ldots, N_k$, the above analysis produces the amplitudes $C_1, C_2, \ldots, C_k$ of the projections of X in the k directions.

Let Q be a complex vector whose real part is V and whose imaginary part is R. That is, $Q = V + jR$. Equation (3) now becomes $C = |(Q,N)|$, or more generally, for different unit vectors $N_1, N_2, \ldots, N_k$, $$C_r = |(Q, N_r)|, r = 1, 2, \ldots k.$$

From Equations (1) and (2) defining V and R, one has $$Q = V + jR = \begin{pmatrix} A_1 e^{j(\phi_1 - \psi)} \\ A_2 e^{j(\phi_2 - \psi)} \\ \vdots \\ A_n e^{j(\phi_n - \psi)} \end{pmatrix} = Z e^{-j\psi}.$$

Substituting this expression into (4), one obtains $$C_r = |(Z, N_r)|$$

Therefore, $$C_r^2 = (Z, N_r)^*(Z, N_r)$$

where the superscript * denotes the complex conjugation of the preceding quantity.

Using (5), one can state the problem of reconstructing the relative phases and polarization of a complex vector Z as follows: for a given set of amplitudes $A_1, A_2, \ldots, A_n, B_1, B_2, \ldots, B_k$, and a given set of unit vectors $N_1, N_2, \ldots, N_k$, it is desirable to find a set of phases among the components of Z such that the computed magnitudes Cr in Equation (4) are equal to the given magnitudes $B_r$, where $r = 1, 2, \ldots, k$. That is, $B_r{}^2 = (Z, N_r)^*(Z, N_r)$, $r = 1, 2, \ldots, k$. (6)

Given one solution to Equation (6), one can always obtain other solutions by complex conjugating z, by multiplying Z by $e^{j\delta}$ for any arbitrary real $\delta$, or by adding a multiple of $2\pi$ to any one of the phases. First, complex conjugating Z causes all phases of its components to change sign. Equations (1) and (2) show that changing the signs of the phases does not affect the vector V but changes the vector R to $-R$. However, this does not change the ellipse defined by V and R, and hence does not change the polarization ellipse of Z. Secondly, multiplying Z by $e^{j\delta}$ for any arbitrary real $\delta$ does not affect the relative phases of the components and consequently does not affect the polarization. Neither does the addition of an arbitrary multiple of $2\pi$ to any one of the phases since doing so does not change V or R.

Therefore, any two solutions to the phase and polarization reconstruction problem may be considered the same if the phases differ by a plus-minus sign, by the same additive constant, or by arbitrary multiple of $2\pi$. All ambiguities of this nature are removed by requiring that the phase of the first component of Z be zero, the phase of the second component of Z be between 0 and $\pi$ inclusively, and are other phases be non-negative and less than $2\pi$. A solution to Equation (6) satisfying these is said to be in standard form.

With $Z^+$ denoting the transpose complex conjugate of 2 and $N^+$ the transpose of Nr Equation (6) becomes $$B_r{}^2 = Z^+ N_r N_r' Z, r \quad (7)$$

Let $\xi_{pq}$ be defined as follows:

$$\xi_{pq} = Re\{Z_p^* Z_q\}, 1 \leq p \leq q \leq n, \quad (8)$$

where $z_p$ and $z_q$ are the p-th and the q-th components of the complex vector Z. Let $\xi$ be a real vector whose n (n−1)/2 components are the $\xi_{pq}$. Taking the real part of Equation (7) and making the substitution (8), one has the following real linear system of equations:

$$D\xi = F, \quad (9)$$

where D is a real matrix with k rows and $n(n-1)/2$ columns and F is a real vector with k components defined as follows: Let the k rows of D be labelled 1, 2, ..., k, but let the columns of D be labelled by pairs of integers (p, q) where p and q ranges from 1 to n, and p is strictly less than q. Then, $D_{m,(p,q)}$, the element of D located at row m and column (p, q), is given by $$D_{m,(p,q)} = 2(N_m)_p(N_m)_q, \quad (10)$$

where $(N_m)_p$ is the p-th component of the real vector $N_m$. The m-th component of F in Equation (9) is given by:

$$F_m = B_m{}^2 - \sum_{p=1}^{n} (N_m)_p{}^2 A_p{}^2.$$

In order for Equation (9) to have a unique solution, it is necessary (but not sufficient) that the number of rows, k, of the matrix D be equal to the number of columns, $n(n-1)/2$. Thus, it is necessary that $$k = \frac{n(n-1)}{2}. \quad (11)$$

Furthermore, there are two possible cases: det $(D) \neq 0$ or det $(D) = 0$.

Case 1: det $(D) \neq 0$

Since the determinant of D is not zero, D is invertible, and Equation (9) has a unique solution $$\xi = D^{-1}F \quad (12)$$

which uniquely determines the $\xi_{pq}$. Using the defining equation (8) for the $\xi_{pq}$, one obtains $$\xi_{pq} = Re\{Z_p^* Z_q\} = A_p A_q \cos(\xi_q - \xi_p). \quad (13)$$

If the magnitude of $\xi_{pq}$ computed from Equation (12) is less than or equal to $A_p A_q$, then Equation (13) can be solved for real $(\phi_q - \phi_p)$. If not, then there are no real $(\phi_q - \phi_p)$ satisfying equation (13); this problem can arise due to experimental errors in obtaining the amplitude measurements $A_1, \ldots, A_n, B_1, \ldots, B_k$. In this case, it is still desirable to find a set of real phases $\phi_1, \phi_2, \ldots, \phi_n$ that satisfy Equation (6) and hence Equation (13) in the least-mean-squared-error sense, i.e. the set of real phases $\phi_1, \phi_2, \ldots, \phi_n$ should give rise to the projected amplitudes $C_1, C_2, \ldots, C_k$ such that $$\left[ \sum_{q=1}^{k} (B_q - C_q)^2 \right]^{\frac{1}{2}}$$

is a minimum. One way to find these phases is by considering the behavior of $\cos^{-1}(y)$ as $|y|$ becomes greater than 1. Using elementary complex variable theory, one can show that $$\cos^{-1}(y) = \begin{cases} (0 + 2k\pi) - j\ln(y \pm \sqrt{y^2 - 1}), \text{ for } y > 1. \\ (\pi + 2k\pi) - j\ln(-y \pm \sqrt{y^2 - 1}), \text{ for } y < -1. \end{cases}$$

A comparison to the graph of the function $\cos^{-1}$ shows that the real part of $\cos^{-1}(y)$ above for a given y is identical to the solution of the non-linear optimization problem of finding a real angle $\phi$ such that $$(\cos(\phi) - Y)^2$$

is a minimum. Thus, one way to find a set of real phases $\phi_1, \phi_2, \ldots, \phi_n$ that satisfy Equation (6) and hence Equation (13) in the least-mean-squarederror sense described previously without having to solve a non-linear minimization problem is by solving for $(\phi_q - \phi_p)$ in Equation (13) as a complex nunsher and then taking its real part. Thus, regardless of whether the magnitudes of $\xi_{pq}$ computed from Equation (12) is less than, equal to, or greater than $A_p A_q$, a solution of Equation (13) is $$\phi_q - \phi_p = \pm \eta_{qp}, \quad (14)$$

for some real and positive $\eta$hd qp, which satisfies Equation (13) either exactly or in the least-squared-error sense as described.

By definition of the $\xi_{pq}$, p is strictly less than q, and $\phi_1 = 0$ by construction. Therefore, with p−1, Equation (14) gives $$\phi_q = \pm \eta_{q1} = \pm \eta_q \quad q = 2, \ldots, n, \quad (15)$$

for some real and positive $\eta_q$. Superficially, Equation (15) suggests that there are $2^{n-1}$ possible combinations of phases, but this is not true because of the constraints imposed by Equation (14) as follows: For each pair (p, q), one computes the left-hand-side of Equation (14) using Equation (15). This produces the following possibilities:

1. $\phi_q = \eta_q, \phi_p = \eta_p$. Then $\phi_q - \phi_p = (\eta_q - \eta_p)$.
2. $\phi_q = \eta_q, \phi_p = -\eta_p$. Then $\phi_q - \phi_p = (\eta_q + \eta_p)$.
3. $\phi_q = -\eta_q, \phi_p = \eta_p$. Then $\phi_q - \phi_p = -(\eta_q - \eta_p)$.
4. $\phi_q = -\eta_q, \phi_p = -\eta_p$. Then $\phi_q - \phi_p = -(\eta_p \cdot \eta_p)$.

A comparison of these with the right-hand-side of Equation (14) shows that either $\eta_{qp} = (\eta_q + \eta_p)$ or $\eta_{qp} = |\eta_q - \eta_p|$ but not both. Therefore, a given value of $\eta_{qp}$ produced from Equation (14) determines either Possibilities 1 and 4 or else Possibilities 2 and 3. In either case, the $\phi_p$ and $\phi_q$ both change sign. As discussed previously, this sign change does not lead to different standard-form solutions to the phase and polarization reconstruction problem.

Thus, if det (D)$\neq$0, the reconstructed phases in standard form and the reconstructed polarization are unique. Or equivalently, det (D)$\neq$0 is a sufficient condition for the uniqueness of the polarization and the uniqueness of the phases in standard form.

Case2: det (D)=0.

Since det (D)=0, D is singular. Therefore, it has a non-zero kernel with a dimension greater than zero. Let $Y_1, Y_2, \ldots, Y_s$ be a basis for the kernel of D where s is a positive integer less than or equal to $n(n-1)/2$. The solution to Equation (9) is no longer unique. The general solution has the following form:

$$\xi = \xi^0 + g_1 y_1 + g_2 y_2 + \ldots + g_s y_s,$$

where $\xi^0$ is any solution of Equation (9), and $g_1, g_2, \ldots, g_s$ are arbitrary real numbers. Proceeding as in Case 1, one obtains $$\phi_q - \phi_p = \pm \eta_{qp}(g_1, g_2, \ldots, g_s)$$

and $$\phi_q = \pm \eta_{q1} = \pm \eta_q(g_1, g_2, \ldots, g_s)$$

for some real functions $\eta_{qp}$ and $\eta_q$ of the $g_1, g_2, \ldots, g_s$. Reasoning exactly as in Case 1 shows that for a fixed set of $g_1, g_2, \ldots, g_s$, the phases are unique up to a simultaneous sign change which leads to the same standard-form solution. However, a different set of the $g_1, g_2, \ldots, g_s$ would clearly produce a different standard-form solution.

Thus, if det (D)=0, the reconstructed phases in standard form and the reconstructed polarization are not unique. Or equivalently, det (D) $\neq$0 is a necessary condition for the uniqueness of the polarization and the uniqueness of the phases in standard form.

The conclusions of Case 1 and Case 2 together state that *det (D) 16 0 is a necessary and sufficient condition for the uniqueness of the reconstructed polarization and the uniqueness of the reconstructed phases in standard form.*

Finally, for an arbitrary finite positive integer n, it is always possible to find the direction vectors $N_1, N_2, \ldots, N_k$, where $k = n(n-1)/2$, such that the matrix D has non-zero determinant because one can always pick those vectors as follows. Because $k = n(n-1)/2$, one can index these vectors by a double subscript (p, q)

where $1 \leq p \leq q \leq n$. Let $N_{pq}$ be chosen to be the vector whose p-th and q-th components are both equal to $$\frac{1}{\sqrt{2}}$$

and all other components are zero. Using Equation (10), one can verify that the matrix D is the k-by-k identity matrix whose determinant is 1. Therefore, by the necessary and sufficient condition for uniqueness, the phase and polarization reconstruction using these direction vectors will be unique. To facilitate further discussion in the later sections these directions will be referred to as the *standard directions*.

It was shown previously that a necessary condition for Equation (9) to have a solution is that $k = n(n-1)/2$. However, since a solution to Equation (9) gives not only the relative phases $\phi_1, \phi_2, \ldots, \phi_n$ but also all of their pairwise differences $(\phi_q - \phi_p)$, and since one is interested only in the relative phases and not all of their pairwise differences it is clear that a solution to Equation (9) provides much more information than necessary. Intuitively, therefore, one might not need all $k = n(n-1)/2$ additional amplitude measurements. Furthermore although $k = n(n-1)/2$ is a necessary condition for Equation (9) to have a solution it is not necessarily a necessary condition for the reconstruction of the relative phases. Thus, one concludes that the reconstruction of the relative phases of a complex vector in n dimensions requires at most $n + k = n + n(n-1)/2 = n(n+1)/2$ amplitude measurements. This is the upper bound on the number of amplitude measurements. The lower bound on the number of amplitude measurements can be found as follows:

It was shown above that one can reconstruct the relative phases $\phi_1 = 0, \phi_2, \ldots \phi_n$ from $\xi_{qp}$, with $p = 1, 2$, and $p < q \leq n$. (Because $\phi_1 = 0$, using Equations (14) and (15) when $p = 1$ give $\phi_2, \ldots \phi_n$ each up to a plus or minus sign, giving rise to $2^{-1}$ possibilities; when $p = 2$, Equation (14) gives the pairwise differences of the phases, and these were shown to restrict the $2^{-1}$ to two possibilities: either $\phi_1 = 0, \phi_2, \phi_3, \ldots, \phi_n$ restrict the $2^{n-1}$ to two possibilities: either $\phi_1 = 0, \phi_2, \phi_3, \ldots, \phi_n$ or $\phi_1 = 0, -\phi_2, -\phi_3, -\phi_n$). Therefore, the only information one needs from a solution of Equation (9) is the values of $\xi_{qp}$, with $p = 1, 2$, and $p < q \leq n$, a total of $(2n-3)$ numbers. Furthermore, fewer than these $(2n-3)$ values of $\xi_{qp}$ will not suffice. One way of obtaining only these $\xi_{qp}$ is to pick the k directions $N_1, N_2, \ldots, N_k$, with $k = (2n-3)$, such that the matrix D computed from Equation (10) can be road-reduced to the following form:

$$D = \begin{pmatrix} & 0 & \cdots & 0 \\ & \cdot & & \cdot \\ \bar{D} & \cdot & & \cdot \\ & \cdot & & \cdot \\ & 0 & \cdots & 0 \end{pmatrix}, \quad (16)$$

where D is a matrix with $(2n-3)$ rows and $n(n-1)/2$ columns, and $\bar{D}$ a square matrix with $(2n-3)$ rows and, $(2n-3)$ columns. If one defines $\bar{\xi}$ to be a vector whose components are $\xi_{qp}$, with $p = 1, 2$, and $p < q \leq n$, then Equation (9) becomes $$\bar{D}\bar{\xi} = F. \quad (17)$$

The necessary and sufficient condition for the uniqueness of the solution in standard form of the relative phase and polarization reconstruction problem implies that det $\overline{D} \neq 0$.

Finally, it is always possible to find $(2n-3)$ directions $N_1, N_2, \ldots, N_{2n-3}$ such that the matrix D is of the form shown in Equation (16) because one can choose them to be the first $(2n-3)$ directions in the set of standard directions described previously. With these, the matrix $\overline{D}$ is, in fact, the identity matrix of size $(2n-3)$, and Equation (17) has the simple solution $$\overline{\xi} = F, \qquad (18)$$

from which the relative phases can be reconstructed as already described.

The simple solution in Equation (18) dictates the design of the device described in this invention. Employing Diode 10 in the geometry depicted in FIG. 1 is tantamount to choosing the directions $N_1$, $N_2$, and $N_3$ to be the first three standard directions, for which the reconstruction of the relative phases is unique and simply obtained via the equality in Equation (18). The inverse cosines required in Equation (13) to obtain the relative phases are stored in a ROM 40 connected as depicted in FIG. 3 to the microprocessor 38. The relative phases are used to compute the major and minor axes of the polarization ellipse using Equation (1) and (2). The vector cross-product of the major and minor axes gives the direction of the source of the vector wave and is displayed in the Output Unit 42.

OBJECTS AND ADVANTAGES

The objects and advantages of the present invention are:

(a) The null direction of the wave is found directly without trial and error.

(b) All measurements are independent and can be measured simultaneously. There is no need to wait for the outcome of previous measurements in order to decide how to measure the next amplitude.

(c) The required number of amplitude measurements is fixed, and can be determined before any measurements are carried out.

(d) Transient events lasting at least one-half cycle are enough to provide amplitude information for the device to function.

(e) The device also functions at high frequencies because only amplitudes are measured.

(f) The device can function at low intensity for the reason that the required amplitude measurements can be obtained by simple counting of quantum events.

(h) Time-delay measurements among the components of the wave vector are not needed.

(i) The device functions even for electromagnetic waves with low photon arrival rate, amplitude measurements being obtained by counting photons.

(j) The device works also for quantum systems where there are no synchronizing lead and reference timebase, and where no general method of constructing the relative phases exists.

When either (a) the intensity is so low that the quantum nature of the vector wave predominates or (b) the vector wave is not electromagnetic nor physical but instead describes a quantum mechanical system, then the diodes 10 and 12 in the device depicted in FIG. 1 are replaced by appropriate physical detectors with a quantum mechanical all-or-none response, such as Geiger counters whose relative counts give the probabilities of which positive real square roots are the amplitudes $A_1, A_2, \ldots, A_n$, and $B_1, B_2, \ldots, B_k$ used in the relative phase reconstruction. The A-D Converter 36 in FIG. 3 is replaced by a counter circuit. The principles and methods of operating the device remain unchanged.

Therefore, it should be understood that although FIG. 1 depicts a device which employs diodes to measure the amplitudes of the electromagnetic field, the device in this invention could employ any amplitude-measuring element that is appropriate for detecting and measuring the amplitudes of the vector wave in a given direction. For example, for water wave at a point near shore, the appropriate amplitude-measuring element could be a system of springs and floats mounted on submerged sticks.

It should be understood that although FIG. 1 depicts a device that measures amplitudes in the x-, y-, and z-directions together with three more amplitudes in the direction $(1, 1, 0)$, $(1, 0, 1)$, and $(0, 1, 1)$, the device could alternatively be constructed to measure amplitudes in the x-, y-, and z-directions together with three more amplitudes in the more general directions specified by unit vectors $N_1$, $N_2$, and $N_3$, that satisfy the necessary and sufficient condition, det $D \neq 0$, for uniqueness of the reconstruction of the relative phases, polarization, and source direction.

It should be further understood that although FIG. 1 depicts a device with two amplitude-measuring elements 10 and 12 mounted at right angle to each other, and whose support axle 20 must be rotated by 120 and 240 degrees to obtain all six measurements, the device could be alternatively constructed to have at least six amplitude-measuring elements mounted so that three of them form a rectangular coordinate system, and at least three of the remaining point in the directions specified by unit vectors $N_1$, $N_2$, and $N_3$, that satisfy the necessary and sufficient condition, det $D \neq 0$, for uniqueness of the reconstruction of the relative phases, polarization, and source direction.

It should also be understood that the dimension n in the method of the invention does not necessarily refer to the dimension of the space in which the device operates. For example, n could refer to a fixed number of terms in the complex Fourier series expansion representing the electron density of in a unit cell of a crystal, and the amplitudes in this case are the real positive square roots of the intensities of the X-ray diffraction, the intensities being the square of the amplitudes of the complex Fourier coefficients. The block diagram in FIG. 3 remains unchanged, and the principles and operations of the invention remain the same.

Although the description above contains many specificities, these should not be construed as limiting the scope of the invention. They only serve to illustrate some of the presently preferred embodiments of this invention. For example, the support axle 20 in FIG. 1 could be replaced, and the mutually perpendicular amplitude-measuring elements 10 and 12 are mounted in the given geometry inside a hollow tube instead, etc.

Therefore, the scope of the invention should be determined by the appended claims and their legal equivalents rather than by the examples given above.

I claim:

1. A device for determining the direction of the source and the polarization characteristics of a vector wave of any polarization and frequency in n dimensions comprising:

a. a plurality of first means for measuring said vector wave's amplitudes as projected along directions determined by said first means;
b. second means for positioning n said first means in a configuration in which said directions of said first means are approximately mutually perpendicular forming an orthogonal coordinate system;
c. third means for positioning $n(n-1)/2$ additional said first means to said configuration where said directions of said additional first means point approximately in the directions of unit vectors $N_1$, $N_2, \ldots, N_{n(n-1)/2}$ relative to said orthogonal coordinate system;
d. Said unit vectors $N_i$, $i=1, 2, \ldots n(n-1)/2$, have coordinates $(N_i)_j$ relative to said orthogonal coordinate system chosen so that the determinant of a matrix D is non-zero, where said matrix D has $n(n-1)/2$ rows numbered $1, 2\ldots, n(n-1)/2$, and $n(n-1)/2$ columns indexed by pairs of integers (p,q), with $1 \leq p < q \leq n$, and the entry of said matrix D at row m and column (p,q) is proportional to $(N_m)_p(N_m)_q$ with a proportionality constant independent of m, p, and q.

2. The device of claim 1 wherein
a. said second means and said third means sequentially position a plurality of said first means;
b. said directions of said first means sequentially point approximately in n mutually orthogonal directions and approximately in directions of said unit vectors $N_1, N_2, \ldots, N_{n(n-1)/2}$.

3. A device for determining the direction of the source and the polarization characteristics of a vector ave of any polarization and frequency in n dimensions comprising:
a. a plurality of first means for measuring said vector wave's amplitudes as projected along directions determined by said first means;
b. second means for positioning n said first means in a configuration in which said directions of said first means are approximately mutually perpendicular forming an orthogonal coordinate system;
c. third means for positioning $2n-3$ additional said first means to said configuration where said directions of said additional first means point approximately in the directions of unit vectors $N_1, N_2, \ldots, N_{2n-3}$ relative to said orthogonal coordinate system;
d. Said unit vectors $N_i$, $i=1, 2, \ldots, 2n-3$ have coordinates $(N_i)_j$ relative to said orthogonal coordinate system chosen so that columns 1 to $2n-3$ of a matrix D form a square matrix with non-zero determinant, and columns $2n-3+1$ to $n(n-1)/2$ are equal to zero, where said matrix D has $2n-3$ rows numbered $1, 2, \ldots, 2n-3$ and $n(n-1)/2$ columns indexed by pairs of integers (p,q), with $1 \leq p < q \leq n$, and the entry of said matrix D at row m and column (p,q) is proportional to $(N_m)_p(N_m)_q$ with a proportionality constant independent of m, p, and q.

4. The device of claim 3 wherein
a. said second means and said third means sequentially position a plurality of said first means;
b. said directions of said first means sequentially point approximately in n mutually orthogonal directions and approximately in directions of said unit vectors $N_1, N_2, \ldots, N_{2n-3}$.

5. The device of claim 4 wherein
a. The dimensions n is three;
b. said second means is a straight elongated support element having an axis, a rotational freedom of approximately 0, 120, and 240 degrees around said axis, and means of attachment for one said first means whose said direction makes an angle of approximately $\cos^{-1}(1/\sqrt{3})$ degrees with respect to said axis, whereby said direction under said rotational freedom will point in three mutually perpendicular directions forming a three-dimensional orthogonal coordinate system;
c. said third means is said support element together with means of attachment for one said first means whose said direction makes an angle of approximately $\cos^{-1}(1/\sqrt{3})+90$ degrees with respect to said axis, whereby said direction under said rotational freedom will point in the directions of unit vectors $N_1, N_2, N_3$;
d. the two first means attached to said second means and said third means have mutually perpendicular directions;

6. The device of claim 5 wherein
a. said vector wave is an electromagnetic wave;
b. said first means is an electrical element whose outputs are proportional to the amplitude of the electric field of said electromagnetic wave.

7. The device of claim 3 wherein
a. the dimension of the space n is three;
b. said unit vectors $N_1$, $N_2$, and $N_3$ are chosen relative to said orthogonal coordinate system to point in the directions of (1, 1, 0), (0, 1, 1) and (1, 0, 1) respectively.

* * * * *